Sept. 9, 1969        J. WIEBE        3,465,713
TIRE SANDERIZER
Filed May 11, 1967
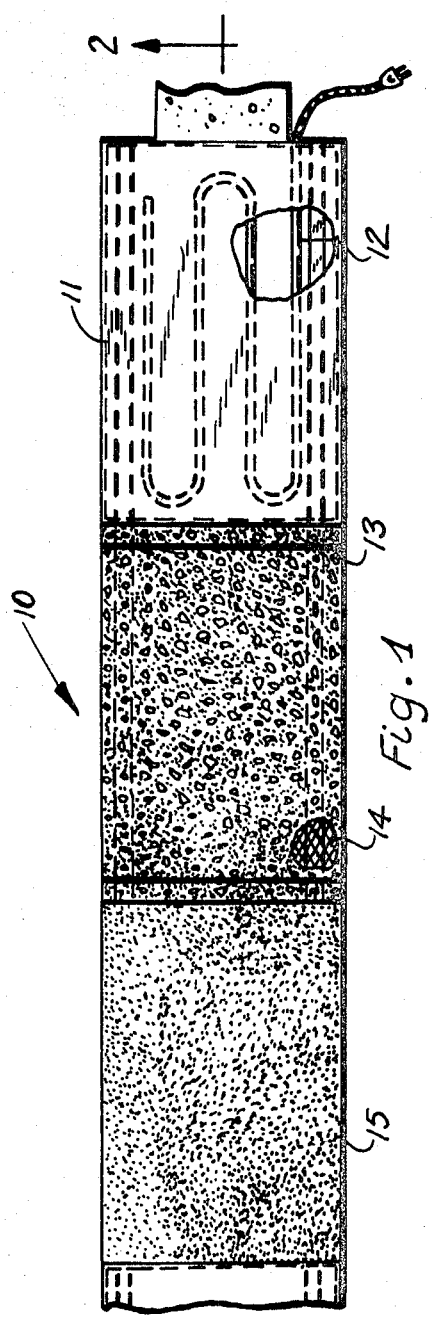
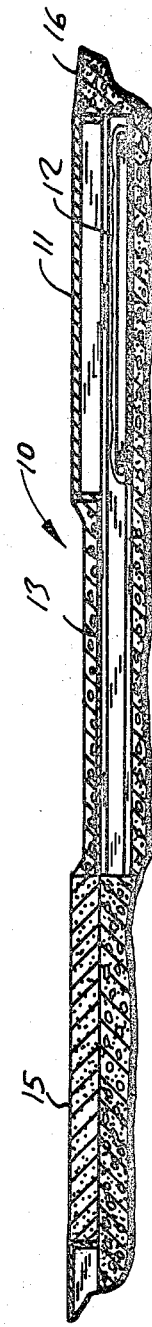
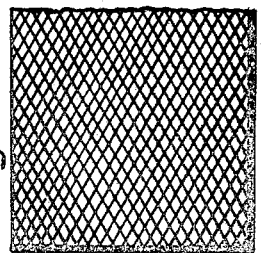
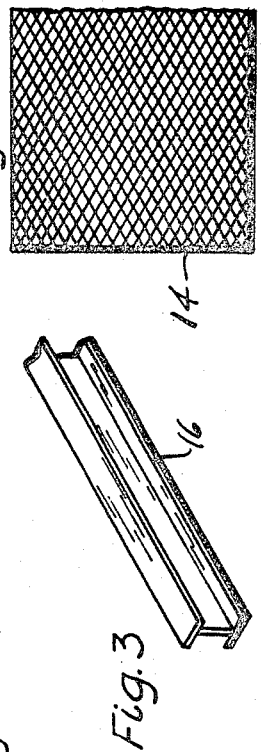
INVENTOR.
Jacob Wiebe

# United States Patent Office 3,465,713
Patented Sept. 9, 1969

3,465,713
TIRE SANDERIZER
Jacob Wiebe, 819 Chesterfield Ave., North Vancouver,
British Columbia, Canada
Filed May 11, 1967, Ser. No. 637,700
Int. Cl. B05c 3/10; B60c 11/00
U.S. Cl. 118—59
2 Claims

ABSTRACT OF THE DISCLOSURE

A tire sanding device to prevent skidding upon icy roads with a guide strip, a hot plate for heating the tire of a vehicle, a pan containing a tough bondable cement and a sand area for applying sand to the tire, the sand forming a rough grit surface in order to prevent the vehicle from skidding.

---

This invention relates to antiskidding applications to tires, and more particularly to an apparatus for applying sand to tires of vehicles.

It is therefore the main purpose of this invention to provide a tire sanderizer which will have a hot plate containing a common heating element which will dry the tires preparatory to applying an adhesive to the treads of vehicle tires.

Another object of this invention is to provide a tire sanderizer which will have a diamond shaped wire mesh screen within the pan containing the adhesive to thus prevent slipping of the tire within the pan.

Still another object of this invention is to provide a tire sanderizer which will have a third area containing sand which will be adhered to the tire by the adhesive placed upon the tire while in the pan of the device.

Other objects and advantages of the invention will become apparent from a consideration of the following detailed description taken in connection with the accompanying drawing wherein a satisfactory embodiment of the invention is shown. However, it is to be understood that the invention is not limited to the details disclosed but includes all such variations and modifications as fall within the spirit of the invention and the scope of the appended claims.

In the drawing:

FIGURE 1 is a top plan view of the present invention shown partly broken away;

FIGURE 2 is a cross-sectional view taken along the lines 2—2 of FIGURE 1;

FIGURE 3 is a fragmentary perspective view of one of the supporting members shown in FIGURES 1 and 2; and FIGURE 4 is a top plan view of the diamond shaped wire mesh screen contained within the pan shown in FIGURES 1 and 2.

According to this invention, a tire sanderizer 10 is provided with a rectangular configurated hot plate 11 containing on its interior a heating element 12 for the purpose of drying the tire surface. Adjacent to hot plate 11 is secured a pan 13 of suitable depth to contain a tough bonding warm adhesive in liquid form, the adhesive being used to coat the tire of the vehicle (not shown). Within pan 13 is a diamond shaped configurated wire mesh screen 14 forming a grid to give traction to the tire while the cement is being applied thereto. A sand containing area 15 is adjacent and is secured to the other end of pan 13 providing a means for the tire to receive the sand when passing over sand area 15. The supporting structure of tire sanderizer 10 is composed of I-shaped beam members 16 to provide maximum rigidity and strength to sanderizer 10.

In use, the heating element 12 within hot plate 11 dries the tread of the tire when it is rolling above hot plate 11. After the drying process the tire then progresses into the pan 13 containing the warm liquid adhesive which is then applied to the tread of the tire. The tire after leaving pan 13 picks up the sand from sand area 15 and is thus provided with a rough friction surface upon the tread which serves to prevent skidding on icy roads and the like.

It will be noted that a guide ramp may be utilized with tire sanderizer 10 if desired.

What I claim is:

1. A tire sanderizer for motor vehicle tires providing, in combination, a plurality of beams of I-shaped cross-sectional configuration for supporting a hot plate of rectangular configuration, heating means carried within said hot plate for drying the tires, a pan member adjacent to and aligned with said hot plate carried by said beams and providing container means for a warm liquid adhesive, a sand area aligned with said hot plate and pan member providing pick-up means for the sand to adhere it to the tire.

2. The tire sanderizer of claim 1 further characterized in that the pan member contains a wire mesh screen to prevent slipping of the tire within the pan member.

References Cited

UNITED STATES PATENTS

| | | | |
|---|---|---|---|
| 942,951 | 12/1909 | Wild | 118—218 |
| 2,067,447 | 1/1937 | Hommel | 118—219 |
| 3,278,998 | 10/1966 | Tingquist et al. | 118—416 XR |

WILLIAM I. PRICE, Primary Examiner

ROBERT I. SMITH, Assistant Examiner